Sept. 1, 1959 E. O. THOMPSON Re. 24,693

MOUTHPIECE ASSEMBLY FOR DENTAL SUCTION EVACUATORS

Original Filed Sept. 19, 1956

INVENTOR:
ELBERT O. THOMPSON,
BY O. K. Mellinckrodt
and Philip A. Mellinckrodt
ATTORNEYS.

United States Patent Office

Re. 24,693
Reissued Sept. 1, 1959

24,693

MOUTHPIECE ASSEMBLY FOR DENTAL SUCTION EVACUATORS

Elbert O. Thompson, Salt Lake City, Utah

Original No. 2,873,528, dated February 17, 1959, Serial No. 610,774, September 19, 1956. Application for reissue April 27, 1959, Serial No. 809,328

13 Claims. (Cl. 32—33)

Figure 1:
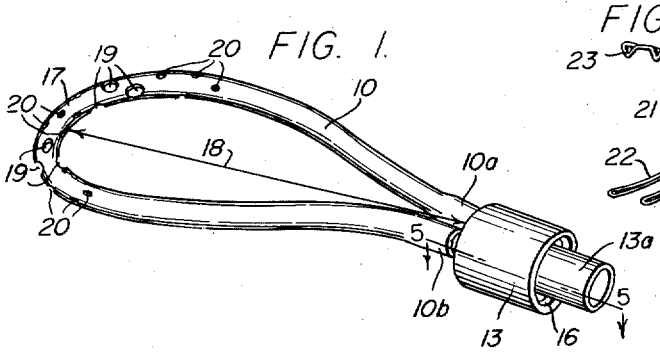

Matter enclosed in heavy brackets [ ] appears in the original patent but forms no part of this reissue specification; matter printed in italics indicates the additions made by reissue.

This invention relates to suction equipment used by dentists in evacuating liquids from the mouths of patients being worked upon. It is concerned particularly with intake mouthpieces for such equipment.

In my several copending applications for U.S. patents identified as follows: (1) Serial No. 411,510, filed February 19, 1954, entitled "Method of Dentistry and Apparatus Therefor"; (2) Serial No. 471,734, filed November 29, 1954, entitled "Evacuative Suction Apparatus"; (3) Serial No. 522,590, filed July 18, 1955, entitled "Evacuative Suction Apparatus," I disclose various forms of dental evacuators capable of establishing an evacuative air stream for entraining and removing saliva, applied wash liquid, debris, and other foreign matter from within the mouth of a patient during the course of dental work.

One difficulty with the apparatus as disclosed has been the necessity of an attendant holding the evacuative nozzle or mouthpiece at all times during the course of the work. This has tended to restrict the field for such equipment to dentists having one or more full-time assistants.

A principal object of the present invention is to enable a dentist to effectively employ such a dental evacuator without the services of an assistant. Other objects are to provide more efficient evacuation in particular instances, even though a dental assistant be present during the progress of the work; to make the dentist's work easier; to make a patient more comfortable during most dental work; to maintain effective drainage over a large area of the mouth in the vicinity of the work; and to permit greater manipulative activity for the dentist, while affording clearer vision of the operative field.

For the accomplishment of these objects, I provide an elongate loop of flexible tubing extending from a fitting adapted for attachment to an evacuator hose, the closed end portion of the loop being provided with a series of openings spaced apart along the length thereof as evacuative inflow ports, and the total length of such flexible loop being considerably greater than the perforated portion, so as to extend well beyond the mouth of a patient and locate the evacuator connection fitting away from the mouth entry.

This not only makes for minimum encumbrance of a patient's mouth during dental work, but enables effective placement of the mouthpiece wherever desired in the mouth and enables the patient, himself, to hold the mouthpiece in position during the course of the work.

The mouthpiece is advantageously used in combination with a jaw spacer and support having feet adapted for insertion within the perforated portion of the flexible tubing and having a jaw-supporting platform supported on the feet by means of legs which are preferably resilient. In this way, a patient biting down on the jaw support during the course of dental work both aids in holding the mouthpiece proper in place and has his mouth comfortably propped open for work purposes.

Further objects and features of the invention will become apparent from the following detailed description of the particular preferred specific form thereof illustrated in the accompanying drawing.

Figure 2:
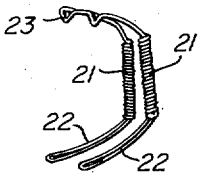
Figure 5:
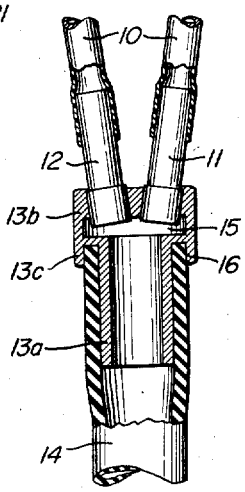
Figure 4:
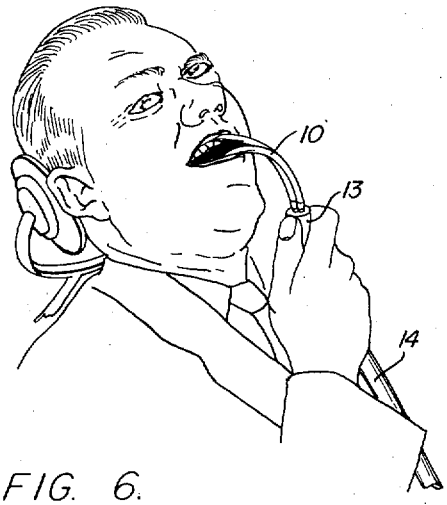
Figure 3:
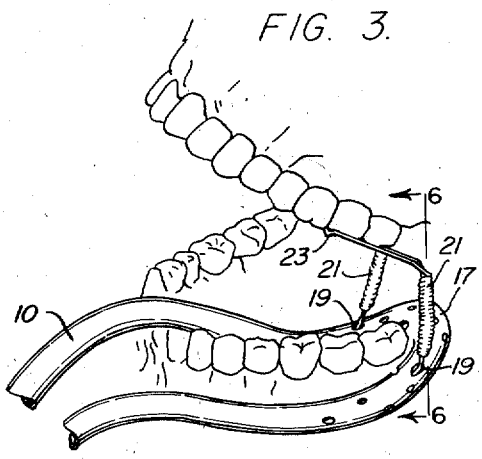
Figure 6:
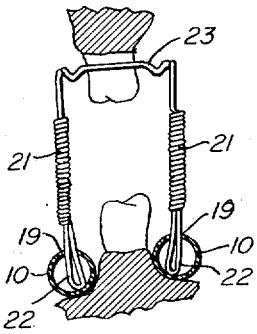

In the drawing:

Fig. 1 represents a perspective view of the mouthpiece, apart from the jaw spacer and support;

Fig. 2, a perspective view of the jaw spacer and support, apart from the mouthpiece;

Fig. 3, a fragmentary perspective view of the mouthpiece of Fig. 1 and the jaw spacer and support of Fig. 2 combined and in working placement within the mouth of a dental patient;

Fig. 4, a perspective view drawn to a reduced scale and showing the manner in which the mouthpiece is held in position by the patient, himself, during the course of dental work;

Fig. 5, a fragmentary longitudinal section taken on the line 5—5 of Fig. 1 and drawn to an enlarged scale; and Fig. 6, a transverse vertical section taken on the line 6—6 of Fig. 3 and drawn to the enlarged scale of Fig. 5.

Referring to the drawing:

As illustrated in Fig. 1, the mouthpiece of the invention comprises a length of flexible tubing, preferably a suitable plastic material, such as vinyl, formed into an elongated loop 10. The ends 10a and 10b of such tubing are tightly fittted over respective branch connector tubes 11 and 12 of an adapter fitting 13, whose main stem 13a is received by the open end of an evacuator hose 14, Figs. 4 and 5, in a close frictional fit.

The stem 13a and the main body 13b of adapter fitting 13 are preferably molded integrally from a rigid plastic material, with the branch connector tubes 11 and 12 being of a corrosion-resistant metal, such as aluminum, and anchored in place in such body during the molding procedure. As so positioned, such tubes 11 and 12 open directly into the interior 15 of adapter body 13b.

An annular receiving recess 16 for the end of hose 14 is advantageously provided about stem 13a by means of a flange 13c extending integrally from adapter body 13b.

The rectilinear length 18, Fig. 1, of the flexible loop 10, from its closed loop end 17 to its oppositely disposed set of mutually adjacent ends 10a and 10b in normal repose of such tube, is considerably greater than the maximum rectilinear distance found within a normal human mouth, so as to locate the adapter fitting completely outside the mouth of a patient by preferably approximately two inches when the mouthpiece is in working position, as is shown for example in Fig. 4.

The flexible tubing making up loop 10 is perforated intermediate its length for fluid intake. For most purposes, it is advantageous to perforate the tubing for a limited distance about the closed loop end 17, for example as illustrated in Fig. 1. The exact distance is not critical.

The perforations preferably comprise a number of relatively large holes 19 and a greater number of relatively small holes 20. As indicated in Fig. 1, it has been found advantageous to group similar holes, and to interpose groups of small holes 20 between groups of large holes 19. Such holes are preferably distributed throughout the complete circumferential area of the perforated portion of the tubing in the manner indicated by Fig. 1.

As so constructed, the mouthpiece is easily washed and sterilized. The length of flexible tubing making up the loop 10 may be easily slipped off connector tubes 11 and 12, and, following washing and sterilization, may be easily slipped back into place. Likewise, the adapter fitting 13 may be easily slipped off hose 14 and *replaced* [relaced] following washing and sterilization.

Such mouthpiece may be placed in the mouth of a patient and used as such, without additional structure. Nevertheless, in many instances it will be found advantageous to utilize the complete assembly contemplated by the invention.

Such complete assembly includes a jaw spacer and support anchored within the loop 10 through perforations thereof.

A preferred form of jaw spacer and support is illustrated, per se, in Fig. 2. It is not new in and of itself, but it does represent one component of a new combination of elements. It is made up of resilient wire, and comprises a pair of mutually spaced legs 21 having elongate [feed] *feet* 22, respectively and supporting a platform member 23. The feet 22 are adapted to be inserted through respective holes 19 of the tubing at opposite lateral sides of the closed loop end 17, see Fig. 3. This anchors the device firmly in jaw-supporting position, the feet 22 being normally planted at opposite sides of a portion of one of the alveolar ridges of the mouth, either lower or upper through usually the former as shown in Fig. 6, and the platform 23 being resiliently supported by the legs 21 in a position against the teeth of the opposite portion of the other alveolar ridge, for holding the jaws apart while the dental work is in progress. Little or no discomfort is occasioned the patient, inasmuch as he can completely relax his jaws without closing his mouth.

Whether or not the jaw spacer and support is utilized in combination with the mouthpiece proper to provide the complete assembly of the invention, effective suction removal of applied liquids, saliva, and debris will be accomplished by proper placement of the loop 10 relative to the work in progress. Such placement for various types of work will be readily apparent to those skilled in the dental art, on the basis of what is shown in Figs. 3, 4, and 6 hereof.

While the length dimension 18 of the loop 10 may vary, depending upon individual choice and upon the type of work to be undertaken, as well as upon individual mouth structure, an all around satisfactory figure for such length dimension is approximately six inches. Tubing having an inside diameter of approximately three-sixteenths of an inch and an outside diameter of approximately five-sixteenths of an inch is preferred for adult use. Utilizing vinyl plastic tubing of this size, a rectilinear length of approximately fourteen inches will give the preferred length dimension noted above for 18.

For use with children, the tube diameter may be decreased by one-eighth of an inch without detrimental effect, thereby facilitating placement in the mouth.

Whereas this invention is here illustrated and described with respect to a specific embodiment thereof, it should be realized that changes may be made within the scope of the following claims, without departing from the essential contributions which I have made to the art.

I claim:

1. A mouthpiece assembly for dental suction evacuators, comprising a length of flexible tubing formed into an elongate flexible loop having a closed loop end provided by an intermediate portion of said length of tubing and an open end provided by opposite end portions of said length of tubing which are disposed in mutual adjacency; an adapter fitting having a pair of branch tubes to which said opposite end portions of the length of tubing are connected, respectively, in fluid-flow relationship, and having tubular means communicating in fluid-flow relationship with said branch tubes and providing connection for a suction hose of a suction evacuator, the rectilinear length of said flexible loop in normal repose condition being sufficiently greater than the maximum rectilinear distance within a normal human mouth to locate said adapter fitting completely outside said mouth when the mouthpiece assembly is in working position, said length of tubing being perforated for fluid intake intermediate its said opposite end portions; and jaw spacing and supporting means removably anchored in said flexible tubing through perforations thereof.

2. The mouthpiece assembly of claim 1, wherein the jaw spacing and supporting means comprises a pair of feet configurated, respectively, for insertion through individual perforations of the flexible tubing and mutually spaced apart for insertion in respective perforations disposed at opposite lateral sides of the closed loop end of the elongate flexible loop.

3. The mouthpiece assembly of claim 2, wherein the jaw spacing and supporting means also comprises a jaw-supporting platform, and leg means supporting said platform on the feet.

4. The mouthpiece assembly of claim 3, wherein at least the leg means is resilient.

5. The mouthpiece assembly of claim 1, wherein the pair of branch tubes of the adapter fitting are disposed side by side at one end of said fitting, and the tubular means for the suction hose is a tubular stem extending from the opposite end of said fitting.

6. The mouthpiece assembly of claim 1, wherein the perforations in the flexible tubing include a plurality of relatively large holes distributed, in groups, among a plurality of relatively small holes.

7. A mouthpiece asssembly for dental suction evacuators, comprising a length of flexible tubing formed into an elongate flexible loop having a closed loop end provided by an intermediate portion of said length of tubing and an open end provided by opposite end portions of said length of tubing which are disposed in mutual adjacency; and an adapter fitting having a pair of branch tubes to which said opposite end portions of the length of tubing are connected, respectively, in fluid-flow relationship and having tubular means communicating in fluid-flow relationship with said branch tubes and providing connection for a suction hose of a suction evacuator, the rectilinear length of said flexible loop in normal respose condition being sufficiently greater than the maximum rectilinear distance within a normal human mouth to locate said adapter fitting completely outside said mouth when the mouthpiece assembly is in working position, said length of tubing being perforated for fluid intake intermediate its said opposite end portions.

8. The mouthpiece assembly of claim 7, wherein the pair of branch tubes of the adapter fitting are disposed side by side at one end of said fitting, and the tubular means for the suction hose is a tubular stem extending from the opposite end of said fitting.

9. The mouthpiece assembly of claim 7, wherein the perforations in the flexible tubing include a plurality of relatively large holes distributed, in groups, among a plurality of relatively small holes.

10. A mouthpiece assembly for dental suction evacuators, comprising a length of flexible tubing formed into an elongate flexible loop having a closed loop end provided by an intermediate portion of said length of tubing and an open end provided by opposite end portions of said length of tubing which are disposed in mutual adjacency; and an adapter fitting having a pair of branch tubes to which said opposite end portions of the length of tubing are connected, respectively, in fluid-flow relationship, and having tubular means communicating in fluid-flow relationship with said branch tubes and providing connection for a suction hose of a suction evacuator, said length of tubing being perforated for fluid intake intermediate its said opposite end portions, said pair of branch tubes of the adapter fitting being disposed side by side at one end of said fitting, and the tubular means for the suction hose being a tubular stem extending from the opposite end of said fitting.

11. A mouthpiece assembly for dental suction evacuators, comprising an elongate flexible loop of flexible tubing; and means for connecting a suction hose of a suction evacuator to said flexible tubing in fluid-flow relationship therewith, said tubing being perforated for fluid intake at locations remote from said suction hose connection means, the perforation in the flexible tubing including a pair of relatively large holes distributed, in groups, among a plurality of relatively small holes.

12. A mouthpiece assembly for dental suction evacuators, comprising a length of flexible tubing formed into an elongate flexible loop having a closed loop end provided by an intermediate portion of said length of tubing and an open end provided by opposite end portions of said length of tubing which are disposed in mutual adjacency; and an adapter fitting having a pair of branch tubes to which said opposite end portions of the length of tubing are connected, respectively, in fluid-flow relationship, and having tubular means communicating in fluid-flow relationship with said branch tubes and providing connection for a suction hose of a suction evacuator, said length of tubing being perforated for fluid intake intermediate its said opposite end portions, the perforations including a plurality of relatively large holes distributed, in groups, among a plurality of relatively small holes.

*13. A mouthpiece assembly for dental suction evacuators, comprising a single, elongate and open loop of flexible tubing; and an adapter fitting to which the ends of said loop are connected, said adapter fitting being positionally fixed with respect to said loop and comprising connection means for a suction hose of a dental suction evacuator, and a pair of tubes in fluid-flow communication with said connection means, said flexible tubing having its said ends connected to said tubes, respectively, in fluid-flow relationship therewith and extending outwardly from said fitting a distance sufficiently greater than the maximum rectilinear distance within a normal human mouth to locate said fitting completely outside said mouth when the mouthpiece assembly is in working position, said flexible tubing being perforated for fluid intake remote from said fitting.*

References Cited in the file of this patent or the original patent

UNITED STATES PATENTS 2,672,143 Gold et al. ---------- Mar. 16, 1954